Jan. 26, 1965 HIROMU KANEDA ETAL 3,167,002

HIGH-SPEED PRINTING APPARATUS IN COMPUTER SYSTEMS

Filed June 6, 1962 4 Sheets-Sheet 1

INVENTORS
HIROMU KANEDA
KAORU SEGAWA
by
OSTROLENK, FABER, GERB & SOFFEN
ATTORNEYS.

HIGH-SPEED PRINTING APPARATUS IN COMPUTER SYSTEMS

Filed June 6, 1962 4 Sheets-Sheet 2

INVENTORS
HIROMU KANEDA
KAORU SEGAWA
by
OSTROLENK, FABER, GERB & SOFFEN
ATTORNEYS.

HIGH-SPEED PRINTING APPARATUS IN COMPUTER SYSTEMS

Filed June 6, 1962 4 Sheets-Sheet 3

INVENTORS
HIROMU KANEDA
KAORU SEGAWA
by
OSTROLENK, FABER, GERB & SOFFEN
ATTORNEYS.

INVENTORS
HIROMU KANEDA
KAORU SEGAWA
by
OSTROLENK, FABER, GERB & SOFFEN
ATTORNEYS.

United States Patent Office 3,167,002
Patented Jan. 26, 1965

3,167,002
HIGH-SPEED PRINTING APPARATUS IN COMPUTER SYSTEMS

Hiromu Kaneda and Kaoru Segawa, Tokyo, Japan, assignors to Nippon Electric Company Limited, Tokyo, Japan Filed June 6, 1962, Ser. No. 200,394
5 Claims. (Cl. 101—93)

This invention relates to printing equipment and, more particularly, to printing apparatus adaptable for use as output equipment for computer systems, data processing systems and the like.

Present high speed computing systems which culminate their computing or data processing operations in printed form require cooperating printing apparatus which operates at speeds sufficient to permit the computer facility to maintain its operation at such high speeds without necessity for computer delays or stoppages in order to permit the printing operation to be performed.

The instant invention provides a rapid and yet reliable printing operation which is controlled by the computer output in such a manner that the operating speeds of the printing assembly are regulated by the operating speeds of the computer.

The system of the instant invention is comprised of a cylindrical type member or printing drum having a plurality of type faces representing alphameric characters wherein each generatrix of the printing member or drum contains a plurality of different alphameric type faces about its periphery and wherein a plurality of such generatrices are provided along the printing member.

Each generatrix contains a like number of alphameric characters, this permitting the printing assembly to print as many characters in one line as there are generatrices along the cylindrical surface of the printing member and further permitting the entire operation to be performed in only one revolution of the cylindrical member.

The printing assembly further includes means for receiving encoded data words from the computer facility which means is comprised of a register for receiving a predetermined number of such encoded data words. The cylindrical member which is in a continuous state of rotation throughout the operation includes photo-electric pulsing means which cooperates with the rotation of the cylindrical printing member to generate the predetermined pulse pattern.

The pulses generated by the photo-electric means are supplied to a counting facility which is arranged to provide a binary coded output and having capabilities of representing two decimal digits such as, for example, the units position and the tens position decimal digits.

The encoded data transferred from the computer facility to the register means is of the same binary form as the binary coded decimal representation in the counter facility. Means are provided for performing a comparison check between each encoded character in the register and the binary coded decimal status of the counter at that given instant in character by character fashion to determine coincidence therebetween. The favorable coincidence check enables the output of the checking facility to control the printing operation.

The printing operation is performed by actuating solenoid operated drive hammers in such a manner as to engage one type face in its associated generatrix at any given instant. One such drive hammer assembly is associated with each generatrix of the printing cylinder.

The first coincidence checking circuit employs a numeric-alphabetic recognition circuit enabling the same checking circuitry of the coincidence check means to be employed for coincidence checking both alphabetic and numeric coded characters.

A second coincidence circuit is provided for actuating each drive hammer driving solenoid wherein one such coincidence circuit is associated respectively with each driving solenoid. The second coincidence circuit is arranged to accept (1) a first signal from the photo-electric means which is indicative of the fact that the type face of the desired alphameric character is beneath the driving hammer associated with that generatrix at that given instant of time; (2) a second input signal imposed upon the second coincidence circuit is received from the check circuit means which is indicative of a coincidence condition between the encoded data word in the register facility which has been compared against the condition of the counter facility; (3) a third input signal is received from a timing circuit which is provided for controlling the printing and paper feed portions of the overall printing cycle. Thus, the printing operation will not take place unless (1) the type of the desired alphameric character is beneath its associated driving hammer, (2) there has been coincidence between the encoded data word in the register facility and the binary coded decimal representation in the counter facility and (3) that the printing cycle has not yet terminated.

It is, therefore, one object of this invention to provide a printing system for employment with high speed large-scale data processing equipment which is so designed as to print one entire line consisting of a plurality of alphameric characters by means of a rotating printing head wherein the alphameric characters which make up each line of printing are all produced within one cycle of rotation.

Another object of this invention is to provide a high speed printing apparatus for use with computer facilities and a like which includes a novel arrangement for printing both alphabetic and numeric characters while at the same time requiring controlled circuitry of no greater complexity than that required for printing numeric (i.e. decimal) characters alone.

Another object of this invention is to provide a printing apparatus for use with high speed computer systems and a like in which a novel coincidence circuit is provided for controlling the printing operation.

Still another object of this invention is to provide a printing system for use with high speed computer systems and a like which further includes a second coincidence circuit arrangement which monitors the security checks imposed upon the encoded data and the printing cylinder so as to permit the occurrence of the printing operation only upon successful completion of each security check, wherein the entire operation occurs within one revolution of the rotating printing cylinder.

These and other objects of my invention will become apparent from the following description of exemplifications thereof, reference being made to the accompanying drawings wherein:

FIGURE 1 is a part diagrammatic and part perspective representation of the printing system of the instant invention.

FIGURES 2*a* through 2*c* show some of the coding arrangements employed in the printing systems of FIGURE 1.

FIGURES 3*a* and 3*b* are sectional views of the photoelectric signalling facility showing an alternative embodiment to that shown in FIGURE 1.

FIGURE 3*c* shows the zone coding arrangement of the slotted disc of FIGURE 3*b*.

Figure 1:
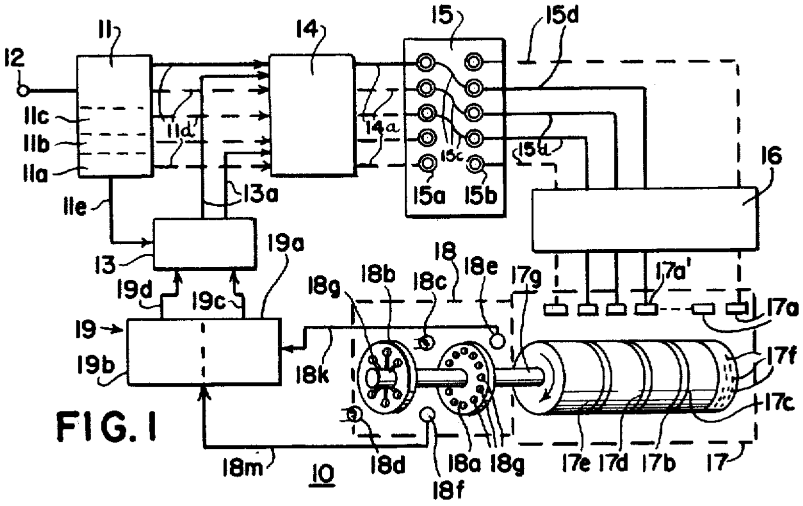

Referring now to the drawings, FIGURE 1 shows the printing system 10 of the instant invention which is comprised of register means 11 having input means 12 for receiving encoded data words from the computing facility (not shown). The register means may be any well known binary storage means, such as a magnetic core matrix, magnetic tape, a magnetic drum, a vacuum tube register, etc. The information received from the computer prior to insertion in the register 11 is sequentially arranged into combinations of words and is timed in such a manner that it is transmitted to the register means 11 so as to supply register means 11 with an information group of ten data words, each data word consisting of 12 encoded figures, thus, a total of 120 encoded alphameric characters are transferred into the register means 11. It should be understood that a greater or lesser number of encoded alphameric characters may be loaded into the register means 11 and the number of characters employed lends no novelty to the instant invention. The register means 11 is provided with a sufficient number of binary bit positions to accommodate all of the encoded data words and is further designed so as to arrange each encoded word in a portion of the register provided respectively for each data word. For example, FIGURE 1 shows three distinct areas, **11*a*, 11*b* and 11*c*, within the register means 11 for receiving the "zero" encoded word, the "first" encoded word and the second encoded word respectively, which data words are transferred from the computer facility (not shown) to the register means 11 in that order. As will be explained in greater detail subsequently, the "zero" encoded word located in position 11*a* of register means 11 is provided for the purpose of apprizing the printing system control circuitry of the type of encoded characters which have been transferred into the register means 11** by the computer facility.

Each binary bit of each encoded data word in register means 11 undergoes a coincidence check in coincidence check circuit 14, the connections between check circuit 14 and register means 11 being represented by lead lines **11*d*. The binary bits of the encoded words in register means 11 are checked against the associated binary bits contained in the counter means 19** which is so designed so as to provide an accumulated count in binary coded decimal form in a manner to be more fully described.

The checking circuit output terminals **14*a* transfer the coincidence circuit output signals to a patchboard facility 15. The coincidence circuit 14 is designed to have a capacity for receiving at least two binary coded decimal characters. This is advantageous since the coding arrangement employed in this invention represents a decimal digit in binary coded decimal form by means of a four binary bit word and further represents an alphabetic character such as the alphabetic characters which make up the English alphabet, for example, by two four-binary-bit words and by providing means to perform a coincidence check on both decimal characters or on one alphabetic character which are contained in register means 11** at any given instant.

The pulses transferred through the patchboard facility 15 from the coincidence check means 14 are further amplified through amplifier means 16 in order to provide pulses of a magnitude sufficient to drive the associated hammer magnets **17*a* connected thereto. The patchboard 15 is provided with a first and second bank of terminals 15*a* and 15*b* respectively and with cooperating jumpers 15*c* in order to permit characters which have passed the coincidence check in circuit means 14 to drive any one of the hammer magnets means 17*a* in any desired arrangement. Conductor means 15*d* are provided from the second bank 15*d* of terminals for transferring pulses to the input terminals of amplifier means 16**.

The printing assembly 17 is comprised of a cylindrical member **17*b* which is driven through continuous rotation by a driving means (not shown) and which further includes a plurality of type faces 17*f* on the drum 17*b* surface for cooperation with their associated hammer magnets 17*a* in a manner to be more fully described. The type faces 17*f* are arranged along the drum 17*b* surface such that each generatrix, for example, generatrix 17*c* has a plurality of alphameric characters such as the decimal digits 0 through 9 and the alphabetic characters A through Z, positioned around the generatrix so that the drum 17*b*, through its rotation, causes the characters arranged along the generatrix 17*c* to pass sequentially beneath its associated hammer magnet 17*a′*. It should be understood that a greater or lesser number of alphameric characters may be arranged along the generatrix since this is a mere design feature and lends no novelty to the instant invention. All other generatrices such as generatrices 17*d* and 17*e*, for example, contain an equal number of alphameric characters to that of generatrix 17*b* wherein the characters positioned along generatrices 17*d* and 17*e* occupy the same angular positions which those characters of generatrix 17*c*** occupy.

Fixedly secured in one end of printing drium **17*b* is a rotatable shaft member 17*g* which is employed as the driving means for rotating the photo-electric signalling means 18 which includes first and second circular discs 18*a* and 18*b* respectively. Discs 18*a* and 18*b* are secured to shaft 17*g* for rotation therewith. Illuminating sources 18*c* and 18*d* are associated with the discs 18*a* and 18*b* respectively as are light sensitive means 18*e* and 18*f* respectively. Disc 18*a* is provided with a plurality of apertures or slits 18*g* arranged adjacent its periphery in such a manner as to alternately permit and prevent passage of illuminating rays from light source 18*c* through disc 18*a* to light sensitive means 18*e*. Likewise, disc 18*b* is provided with a plurality of apertures 18*g* arranged adjacent its periphery for alternately permitting and preventing the passage of light rays from illuminating source 18*d* through disc 18*b* to light sensitive means 18*f*. The impinging of light rays upon the light sensitive means such as means 18*e*, for example, generates electrical pulses therein which pulses are transferred by lead 18*k* to a binary coded decimal counter means 19 of a type well known in the art. The light sensitive means 18*f* operates in a similar manner generating pulses which are transmitted through lead 18*m* to the second decimal stage 19*b* of counter means 19. The apertures which are provided in discs 18*a* and 18*b* are equal in number to the number of alphameric character types contained in each generatrix so as to generate a two position binary coded decimal number wherein each such binary coded decimal representation identifies (i.e. is associated with) a particular alphameric character type in that generatrix, thus, the count in the counter means 19 which is generated in a manner to be more fully described produces a numerical representation which identifies the particular alphameric character which is beneath its associated drive hammer 17*a* at any given instant throughout the rotation of printing drum 17*b***.

The count produced in counter means 19 is transferred by means of leads **19*c* and 19*d* to control means 13 which transfers the binary coded decimal representation from counter means 19 to coincidence check circuit 14 by means of leads 13*a*. The control circuitry 13 operates in a manner to be more fully described under control of the "zero" word in register means "zero" position 11*a* to cause the units position binary coded decimal representation from the counter portion 19*a* to be transferred to the coincidence check means 14 and which further transfers both the units and tens position binary coded decimal representation from counter positions 19*a* and 19*b* respectively to coincidence check means 14** when an alphabetic character is being checked for coincidence therein.

It should be noted that the binary coded decimal representations in each word position of register means 11 such as word positions 11*b* and 11*c*, for example, represent coded characters in the same binary coded decimal coding arrangement employed in the counter means 19. It should be noted that since counter means 19 provides a count in binary coded decimal form, it is necessary to convert the computer output data into the binary coded decimal form for use in register means 11 which conversion operation may be carried out in any well known manner.

The pulse count is photo-electrically selected out in accordance with the arrangement of the alpha-numeric types on the type wheel or printing drum 17*b*, the pulse generating mechanism being in the form of disc slits or apertures 18*g* or 18*h* respectively which rotate in synchronism with the type drum 17*b* of the printing equipment 17. These pulses are transferred to the counter means 19, for generating an indication of the location of the types arranged about drum 17*b* and the phase of rotation thereof. The pulse generating means 18 consists of the count pulse generating mechanism and zone pulse generating mechanism which are comprised of discs 18*a* and 18*b* respectively. The photo pulses being received by this counter are converted to numerals of two decimal digit positions, symbolizing the selection phase of types of the tabulating or printing equipment 17.

Letter-numeral transfer relay equipment 13 operates automatically from the information received by the "zero" word in the register means 11 which word is employed to control the coincidence check means 14 to operate so as to check encoded words representative of numerals or representative of alphabetic characters as will be more fully described. The register or counter means 19 is constructed in such a way that an alphabetic character is represented by two decimal digits, each alphabetic character being grouped into a two-figure number which is checked against the ones and tens decimal digit positions 19*a* and 19*b* of the counter means 19 by transferring both outputs 19*c* and 19*d* to the coincidence check means 14 by means of relay circuitry 13.

Figure 2A:
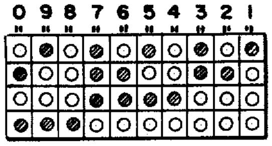
Figure 2B:
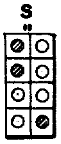
Figure 2C:
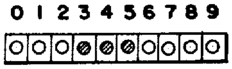

To understand the coding arrangement of this system, reference is hereby made to FIGURES 2*a* through 2*c*. Each numeric character such as the numeric characters of the decimal system which are 0 through 9, is composed of a four-binary-bit-position encoded character, each bit position being capable of assuming either a mark or space condition, such as is shown in FIGURE 2*a*. The darkened circles represent the mark or pulse condition, while the white circles represent the space or no-pulse condition. The decimal number 3 is represented in mark-space code with the four elements of mark-mark-space-space, which can clearly be seen in FIGURE 2*a*, while the decimal number 8 is represented by space-space-space-mark. FIGURE 2*b* shows the composition of the code employed for representation of an alphabetic character, such as, for example, the alphabetic character "S." Encoding consists of a group of two encoded numerals which, considered separately, is identifiable as the coded representation for the numeral 3 and the coded representation for the numeral 8 respectively. The remaining characters of the alphabet are likewise represented by two binary or mark space coded characters, but it should be understood that the mark and space positions of each coded group or pair would of necessity be unique from the coded groups of the other letters of the alphabet.

For purposes of the instant invention, the information to be printed on one line of the line printer 17 is hereby designated as an information group. In the case of an output of an electronic computer, one word is composed of twelve characters for numerals and six characters for letters and each information group consists of a ten-word group, which is considered as one unit of the information group. FIGURE 2*c* denotes the code of the instruction for "zero" word which has a length of ten binary bits where each bit represents one character of the information group and further controls the coincidence check treatment of that word, dependent upon whether it is composed of letters, numbers, or a combination thereof. The "zero" word shown in FIGURE 2*c* employs a mark or dark circle to represent an alphabetic character while the space or light circle represents a numeric character. Thus, considering the "zero" word shown in FIGURE 2*c*, the coded representations in positions 0, 1 and 2 of the register means 11 identify numeric characters, the coded representations in positions 3, 4 and 5 of register means 11 represent alphabetic characters and the coded representations in positions 6, 7, 8 and 9 of register means 11 represent numeric characters. As a further example, assuming all ten positions (0 through 9) of the "zero" word shown in FIGURE 2*c* had a mark pulse in each and every position, it should be understood that all ten characters of the information group contained in the register means at that given instance would all be coded representations of alphabetic characters.

Figures 3A, 3B, 3C:
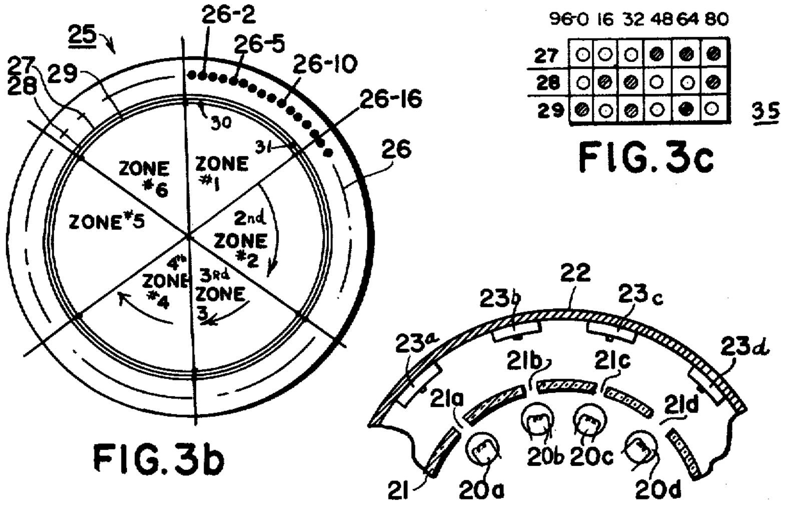

FIGURE 3*a* is an exploded view of an alternative embodiment of the pulse generating mechanism 18 of FIGURE 1 showing the illuminating sources 20*a* through 20*d* arranged in an arcuate fashion and being surrounded by a cylindrical member 21 having slits 21*a* through 21*d*. Mounted inside a second cylinder 22 are photo diode means 23*a* through 23*d* cooperating with each of the illuminating sources 20*a* through 20*d*. It should be understood that the illuminating sources 20*a* through 20*d* and the associated photo diodes 23*a* through 23*d* respectively are arranged in a staggered fashion along the cylinder longitudinal axis so that photo diode 23*a*, for example, is illuminated only by illuminating source 20*a* and through slits or apertures 21*a* through 21*d* and that the remaining illuminating sources 20*a* through 20*d* and cooperating photo diodes 23*b* through 23*d* respectively each occupy a separate longitudinal position along the cylinder longitudinal axis and likewise have their own group of cooperating apertures. The pulses are generated by making illuminating sources 20*a* through 20*d* and photo diodes 23*a* through 23*d* stationary and coupling cylinder 21 to the printing drum 17*b* in any well known manner so that the rotation of printing drum 17*b* is imparted to cylinder 21.

Another alternative embodiment to the photo-electric pulse generating means shown in FIGURE 1 is the circular disc arrangement 25 shown in FIGURE 3*b*. A first circle 26 is provided near the periphery of disc 25 with 96 apertures arranged around the circle 26 for cooperation with an illuminating source and a photo-sensitive pick-up means in a manner set forth with reference to FIGURE 1 so as to be capable of generating 96 individual pulses in one complete revolution. The pulses are employed to represent 96 different angular positions of the printing drum 17*b* and, therefore, capable of identifying 96 distinct alpha-numeric characters such as, for example, the numeric characters 0 through 9, the alphabetic characters A through Z of the English alphabet, and the 48 alphabetic characters of the Japanese alphabet, together with 12 punctuation marks or other symbols, thus providing for the representation of 96 different alphameric characters and/or other symbols.

The type drum 17*b* is divided into six equal angular zones, each zone containing 16 sub-divisions, giving an overall total of 96 positions. In order to identify the first position of each of the six zones, three circles 27, 28 and 29 respectively are provided, each having a predetermined arrangement of apertures at the start position of each zone, which apertures cooperate with illuminating sources and photo-sensitive means for generating a predetermined code at each position for distinctly identifying the start position of each of the six zones.

Thus, to identify the zero position which is the first position of zone 1, an aperture 30 is provided along circle 29 and to identify the sixteenth position which is the first position of zone 2, an aperture 31 is provided along circle 28. Referring to FIGURE 3*c*, the chart 35 shows the coding arrangements for 0, 16, 32, 48, 64 and 80 angular positions which are the first positions of the zones 1 through 6 respectively where the dark circles represent apertures along the circles 27, 28 and 29 of disc 25 and where the light circles represent no apertures. The illuminating sources and photo-electric means cooperating with these code groups arranged in circular disc 25 act to set the counter means 19 to the decimal values of 16, 32, 48, 64, 80 and 96, thus permitting the printing cycle of the assembly set forth herein to be started at any one of the zones and not necessarily requiring the equipment to start, therefore, at the zero position, that is, at the first position of zone 1. The apertures 26–0 to 26–95 provided along circle 26 of circular disc 25 are provided for generating the 16 pulses within each zone to complete the selection of types within each zone.

The typewriting operation is performed in such a manner that while the pulse is generated from the pulse generator means 18 which operates under control of the rotating drum **17*b*, these pulses cause counter means 19 to provide a binary coded decimal count which is coincidence checked against signal information entered into the register means 11 from the computer so that only when the characters to be printed come to the predetermined locations with respect to their associated drive hammers is the printing operation ejected. Thus, typewriting of one complete line is accomplished within only one rotation of the type drum 17*b***.

Figure 4:
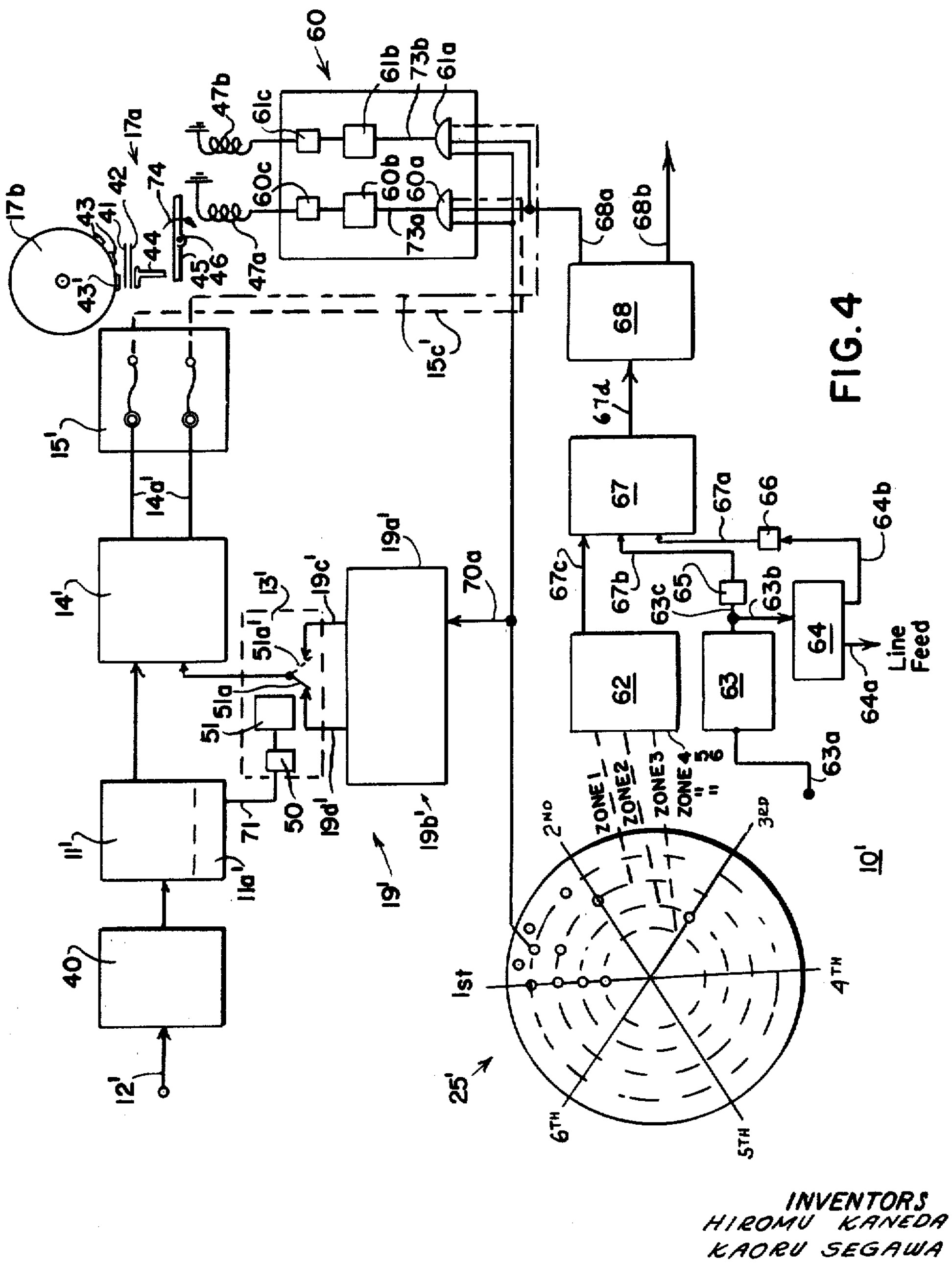
FIGURE 4 is a diagrammatic representation of the printing system of FIGURE 1 showing a portion of the system in greater detail.

The function of the zone pulse generating arrangement of FIGURE 3*b* and its cooperation with the remainder of the printing assembly will be better understood when considering FIGURE 4 of the drawings. The printing assembly 10' of FIGURE 4 is comprised of a register means 11' of the same type as register means 11 shown in FIGURE 1. Amplifier means 40 is provided for amplifying the output signal of the computer (not shown) which pulses are impressed upon input terminal 12' in order to provide pulses of an adequate magnitude level for utilization in register means 11'. All numerals marked with a prime in FIGURE 4 are the full equivalent of the components bearing the same number in FIGURE 1 of the drawings and will not be explained in detail.

When the ten-word information group is transferred from the computer (not shown) to register means 11', the computer then generates a signal which indicates the request of a typing operation. This signal is impressed upon input terminal **63*a* of typing initiation circuit 63 which, upon receipt of the typing operation signal at its input terminal 63*a*, generates an output sgnal which is impressed upon line feed initiating circuit 64 by means of output lead 63*b*. Line feed control circuit 64 generates a signal at its output terminal 64*a* causing the paper (not shown) employed as the printing surface to be advanced one position. Simultaneously therewith, line feed control circuit 64 generates a signal which is transferred to output lead 64*b* and amplifier means 66 to one input terminal 67*a* of coincidence circuit 67. The outputs of typing operation initiation control circuit 63 are impressed simultaneously upon the input of line feed control circuit 64 and upon amplifier 65 which amplifies this output signal and impresses it upon input 67*b* of coincidence circuit 67. Zone identification circuit 62, which is controlled by the photo pulse generating means 25', is likewise a coincidence type circuit and is arranged so as to generate an output signal at the start only of each of the six zones and impressing this output signal upon input terminal 67*c* of coincidence circuit 67. Coincidence or monitoring circuit 67 generates a signal at its output terminal 67*d* only upon simultaneous occurrence of input pulses at its input terminals 67*a* through 67*c*, thus insuring the fact that: line feed operation has been performed; the printing operation instruction has been received from the computer; and the printing drum occupies a position at the beginning of one of its six zones at this given instant. This output signal generated by monitoring circuit 67 is impressed by its output terminal 67*d* upon the input of a counting circuit 68. Counting circuit 68 is so arranged as to provide a count of 0 through 7 whereby the count is advanced by one each time the first position of a new zone is recognized by zone indicating circuit 62. When the count contained in counting circuit 68 is from 0 through 6, counting circuit 68 generates a signal at its output terminal 68*a* thereby permitting the occurrence of the printing operation in a manner to be more fully described. At the same instant counting circuit 68 generates no output signal at its output terminal 68*b*. However, when a count of 7 is contained in counting circuit 68, this is indicative of the completion of one revolution of the printing drum 17*b*'. At this instance counter 68 is adapted to generate no output pulse at its terminal 68*a* and to generate an output pulse at its terminal 68*b*. The absence of an output pulse at its terminal 68*a* prevents any printing at this time and the presence of an output pulse at its terminal 68*b* indicates the completion of one revolution of the printing drum 17*b*' and likewise a completion of the printing of one information group, the composition of which has been described previously. The output signal at terminal 68*b* is employed to control the computer (not shown) to place more information into the register means 11'** for initiation of the next printing cycle.

The counting circuit operation of the lower half of FIGURE 4 thereby enables printing to be performed in one revolution and, further, to begin the printing operation at the beginning of any one of the six zones and is therefore not limited to the requirement that the printing operation begin only at the start of the first zone.

Referring now to the circuitry shown in the upper half of FIGURE 4, information from the computer is amplified by the amplifier 40 and impressed upon the register means 11' where the coded information is successively arranged by combinations of words and timing so as to produce a group of ten words wherein each word consists of 12 characters. Each of the 120 coded characters is checked against the state of the counter which operates in synchronism with the printing drum and under control of the slots which are provided in slotted cylindrical disc 25' of the printing equipment which generates photo-pulses and impresses these pulses by means of lead 70 and **70*a* upon counter means 19. Counter means 19' converts these pulses so as to form two binary coded decimal characters in its units and tens positions 19*a*' and 19*b*', respectively. The binary coded decimal representation of the units position is available at output terminal 19*d*'**.

The (zero) control word in position **11*a*' of register means 11', transfers its information by means of leads 71 to amplifier means 50 and relay 51 causing the operating of relay contact 51*a* to control its engagement with either output lead 19*c*' or 19*d*' depending upon whether coincidence check means 14'** is in the process of checking either a numeric coded character or alphabetic coded character. For example, assuming that the first coded character to be checked is a numeric character, then the first or zero position of the zero word (see FIGURE 2*c*) will be in the space condition. In this condition no output pulse is transferred through lead 71 to amplifier 50, thereby placing relay means 51 in the deenergized state. In this condition contact **51*a* is in its position 51*a*' causing the coded representation of the units position 19*a*' of counter means 19' to be transferred to coincidence check means 14'. If, however, an alphabetic character is undergoing a coincidence check, the "zero" or instruction word contains a mark pulse in that position causing amplifier 50 to be energized thereby energizing relay 51 causing contact 51*a* to assume its solid line position as shown in FIGURE 4, thereby transferring the coded representation in the tens position 19*b*' of counter means 19' to coincidence check means 14'**.

Upon the completion of the checking operation in coincidence check means 14′, when coincidence exists, this condition is transferred from output terminals 14a′ and patchboard 15′ to the input terminals of logical AND gates 60a and 61a respectively. It should be understood that each output terminal 14a′ and hence 15c′ is employed for a different generatrix of the drum, such as is clearly shown in FIGURE 1 of the drawings. Each logical AND gate 60a and 61a receives three separate input signals. For example, logical AND gate 60a receives: an input signal from the lead 70a from the photo-pulsing equipment; a second input signal from counting circuit output terminal 68a; and a third input signal from terminal 15c. The operation of the AND gate 60a is such that all three of the signals impressed upon its input terminals must occur simultaneously in order to have an output pulse generated at output terminal 73. Thus, in order for AND gate 60a to generate an output at its output terminal 73a, there must have been coincidence, the circular disc 25′ must still be in the same angular position and, finally, the printing system must still be in the printing portion of the overall printing cycle. When all three of these signals appear simultaneously at the input terminals of AND gate 60a, the signal generated at its output terminal 73a is impressed upon a monostable flip-flop circuit 60b. The function of the monostable flip-flop circuit 60b is such as to broaden the width of the input pulse impressed upon its input terminal whereas so as to make it of sufficient pulse width to drive the printing solenoid 47a associated therewith in a manner to be more fully described. The output signal of the monostable flip-flop 60b is impressed upon an amplifier means 60c which, in turn, energizes relay coil 47a. Energization of relay coil 47a causes armature member 45 to be urged in the clockwise direction about its pivot 46 as shown by arrow 74, causing drive hammer 44 to move vertically upward, causing the character of type 43′ to be engaged by type ribbon 41 and thereby to print this character upon cooperating print roll 42, thereby typing the appropriate character upon the paper 42.

Figure 5:
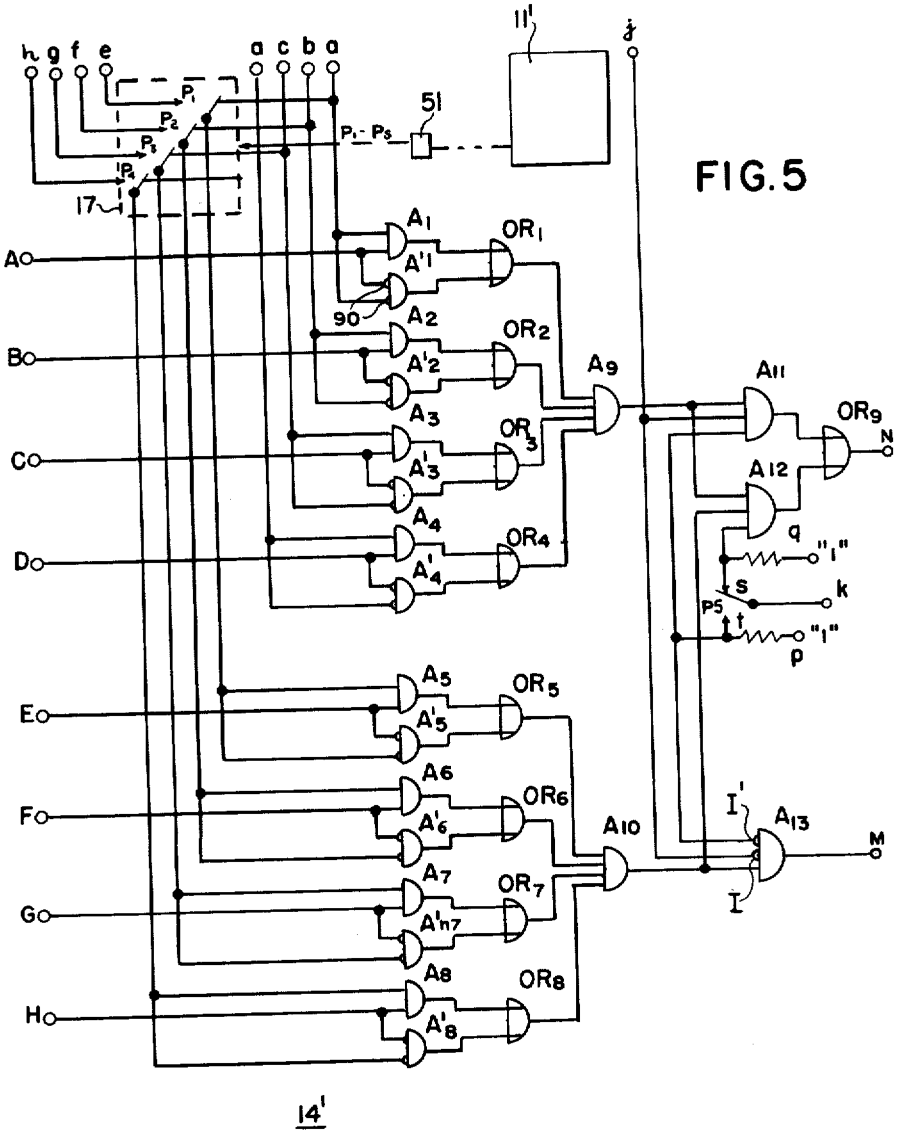
FIGURE 5 is a logical diagram of the coincidence circuit employed in the printing system of FIGURE 1.

The circuitry of coincidence circuit means 14 and 14′ of FIGURES 1 and 4, respectively, is shown in greater detail in FIGURE 5 and is comprised of a plurality of logical AND gates $A_1$ through $A_8$ and $A_9$ through $A_{13}$; inhibitor AND gates $A_1'$ through $A_8'$, and OR gates $OR_1$ through $OR_9$. The AND gates $A_1$ through $A_8$ and $A_9$ through $A_{13}$ operate so as to generate a signal at their output terminals only when signals are simultaneously present at each of their input terminals. For example, AND gate $A_1$ produces a signal at its output terminal only when signals are simultaneously present at its input terminals A and a, respectively.

Inhibitor AND gates $A_1'$ through $A_8'$ each have inverter means 90 at each of their input terminals which act to invert the signal impressed upon the inverter means so as to impress an inverted output which is 180° out of phase with the signal impressed upon its input terminal. For example, assuming signals are impressed upon the inhibitors 90 of AND gate $A_1'$, these signals would be inverted by inverter means 90 so as to impress no signals upon AND gate $A_1'$ causing no signal to be generated at the output of inhibitor AND gate $A_1'$. Assuming, however, that no signals are impressed upon the inhibitor means 90 of inhibitor AND gate $A_1'$, the inverter means 90 would invert this condition, causing signals to be impressed upon the input terminals of AND gate $A_1'$, thereby generating a signal at its output terminal. Thus, it can be seen that inhibitor AND gate $A_1'$, and likewise the other inhibitor AND gates $A_2'$ through $A_8'$ generate a signal at their output terminals only in the absence of signals at both of its input terminals simultaneously so that when a signal is impressed upon the inhibitor means 90 of the inhibitor AND gate, that is, of either inhibitor means or both simultaneously, then the inhibitor AND gate $A_1'$ generates no output signal.

The OR gates $OR_1$ through $OR_8$ generate a signal at their output terminals when a signal is present at any one of its input terminals even though no signal or signals are present, at the remaining input terminals of the OR gates.

The operation of the coincidence check circuitry 14′ of FIGURE 5 is as follows:

First, let the input terminals labeled A through H be of the 8 binary bit or mark-space positions of four-unit encoding character positions of the register means 11 wherein the terminals labeled A, B, C and D represent the terminals for receiving the first encoded character and the terminals E, F, G and H being the terminals for receiving the encoded character occupying the second position in the register means. Also, let the terminals labeled a through h be the terminals for receiving the encoded data from the counter means 19 shown in FIGURES 1 and 4 of the drawings. Terminals a through d receive the four-bit positions from the units position of the counter means and the terminals e through h receive the bit positions of the tens position of counter means 19. The relay contacts $P_1$ through $P_4$ and $P_5$ are the operating contacts of the letter-numeral transfer relay 51 shown and described in FIGURE 4 of the drawings with the illustration shown in FIGURE 5 when checking of numerals is being performed.

In this case, terminals a, b, c and d taken from the units position 19a′ of the counter are impressed upon one of the input terminals of AND gates $A_1$ and inhibitor AND gates $A_1'$ through $A_4'$. Outputs are generated by AND gates $A_1$ through $A_4$ and $A_1'$ through $A_4'$ only when signals are present simultaneously at their inputs which signals are then transferred to OR gate circuits $OR_1$, $OR_2$, $OR_3$ or $OR_4$. In the example of FIGURE 5, the terminals a, b, c and d which are connected to the units position of 19a′ of counter 19 and the terminals A, B, C and D which are connected to the units position of the first coded character of register means 11′ are transferred to the AND gates $A_1$ through $A_4$ and $A_1'$ through $A_4'$, the outputs of which are transferred to the OR gates $OR_1$ through $OR_4$ when coincidence between the signals and the register means and the counter means occurs. Also when the input unit codes on both sides are "zero," that is, when there is an absence of the signal in a bit position of both register means and counter means 11′ and 19a′ respectively, then the inhibitor AND gates $A_1'$ through $A_4'$ generate output signals which are then transferred to OR gates $OR_1$ through $OR_4$. In this manner, only when complete coincidence occurs with respect to either presence or absence of signals, then outputs of signals are produced which are transferred to the appropriate OR gates. When each of the four OR gates $OR_1$ through $OR_4$ generates a signal at their outputs AND gate circuit $A_9$ produces a signal at its output terminal.

The input terminal "J" receives a binary "1" from the "zero" word of the register means and a "0" from the "zero" word in register means 11′ when the character to be checked is either a numeric or alphabetic character respectively. Terminal "K" is always at the binary "0" position throughout the entire printing cycle. In a like manner, terminals "P" and "Q" are always at the binary "1" position throughout the printing cycle. Thus, in order for AND gate $A_{11}$ to generate a signal at its output terminal, there must be an output signal from AND gate $A_9$ which indicates coincidence between the signals between terminals "A" through "D" and a through d respectively; a binary "1" level signal from input terminal "J" indicating that a numeric character is being checked for coincidence and a binary "1" level signal is impressed from terminal "P" causing AND gate $A_{11}$ to generate an output signal which is passed through OR gate $OR_9$ to output terminal "N." Since an alphabetic character is not being checked for coincidence at this time, the binary "1" level present at the input terminal "J" due to the inhibitor "I" provided on AND gate $A_{13}$ prevents any signal from being generated at output terminal "M." Likewise, relay contact $P_5$, being in the position shown in FIGURE 5, places a binary "0" upon one input terminal of AND gate $A_{12}$, preventing any signal from passing therethrough.

In the case of performance of a coincidence check on a coded alphabetic character which is made up of two encoded numeric characters, input terminals E through H transfers signals from the associated positions of the register means 19' to the AND gates $A_5$ through $A_8$ and $A_5'$ through $A_8'$ respectively, which are to be compared with the signals being impressed upon input terminals *e* through *h* in a manner similar to that described above with respect to checking of the coded numeric character. The relay means 51 operates under control of the "zero" word of register 11' to operate the relay contacts $P_1$ through $P_4$ and $P_5$ to the positions opposite those shown in FIGURE 5 of the drawings, thus connecting terminals *e* through *h* to the associated AND gates $A_5$ through $A_8$ and $A_5'$ through $A_8'$, respectively. The AND gates $A_5$ through $A_8$ and $A_5'$ through $A_8'$ generate output signals only upon occurrence of complete coincidence of the signals impressed upon their input terminals which, in turn, are passed by OR gates $OR_5$ through $OR_8$ and AND gate $A_{10}$. When AND gate $A_{10}$ generates a signal at its output, this is impressed upon one input terminal of AND gate $A_{13}$. Input terminal "J" is in the binary "0" state when checking of an alphabetic character is being performed but due to the inverter operation of inverter I provided for in AND gate $A_{13}$, this generates a signal at this input terminal. Relay contact $P_5$ moving from the "S" position shown in FIGURE 5 to the "T" position, places a binary "0" level upon the inhibitor means I' of AND gate $A_{13}$. The inverter operation, however, places a signal upon this input terminal $A_{13}$, thereby causing AND gate $A_{13}$ to generate a signal at its output terminal M.

The coincidence checking operations of the circuitry of FIGURE 5 may be expressed by the following logic (Boolean algebra) equations:

$$
\begin{aligned}
N &= A_9.j.t.\pm A_9.A_{10}.S \\
&= (aA+\overline{aA})(bB+\overline{bB})(cC+\overline{cC})(dD+\overline{dD}).j.t \\
&\quad +A_9.A_{10}.S \\
M &= A_{10}.j.t \\
&= (aE+\overline{aE})(bF+\overline{bF})(cG+\overline{cG})(dH+\overline{dH}).j.t
\end{aligned}
$$

Since the contact $P_5$ has the true value of binary "0" under the closed condition and binary "1" under the open condition, and terminal "J" becomes binary "1" for the ones position and binary "0" for the tens position, the above equations become, when checking for encoded numeric representations:

$$
\begin{aligned}
N &= (aA+\overline{aA})(bB+\overline{bB})(cC+\overline{cC})(dD+\overline{dD}).j \\
M &= (aE+\overline{aE})(bF+\overline{bF})(cG+\overline{cG})(dH+\overline{dH}).j
\end{aligned}
$$

Therefore, since terminals N and M produce outputs only when checking of A through D and E through H coincide, respectively, with the four-bit positions codes in the units and tens position of the counter 19', only then can the required types for numerals be printed in accordance with the respective coincidence checks. Secondly, in the case of encoded alphabetic characters, the numeric-alphabetic transfer relay 51 is automatically operated by the information contained in the "zero" word in register means 11' operating the contacts $P_1$ through $P_4$ and $P_5$ to the positions opposite those shown in FIGURE 5 of the drawings. Thereupon, pairs of numeric coded representations in the register 11' are checked against the ones and tens coded character positions of the counter 19'. Checking of the signals impressed upon terminals *a, b, c* and *d* in the counter units position **19*a'* against the signals impressed upon input terminals A, B, C and D from register means 11'** are performed in such a manner that an output signal of the binary "1" level is generated by AND gate $A_9$ only when the checking operation shows that there is complete coincidence. At the same time signals impressed upon input terminals *e, f, g* and *h* from the tens position **19*b'*** of the counter are prepared for coincidence with signals impressed upon the input terminals E, F, G and H so that only under conditions of exact coincidence do the OR gates $OR_5$ through $OR_8$ and the AND gate $A_{10}$ generate output signals.

The output from the AND gate $A_{10}$ is impressed upon AND gates $A_{12}$ and $A_{13}$. The output from terminal K is impressed upon input terminals for AND gates $A_{11}$ $A_{13}$, inhibiting an output from AND gate $A_{11}$, while permitting an output from AND gate $A_{13}$ due to the inhibitor means I' of AND gate $A_{13}$ provided for this purpose. For AND gate $A_{12}$, an output will be generated therefrom when $A_9$ generates an output signal, when $A_{10}$ generates an output signal and when relay contact $P_5$ is in the position opposite of that shown in FIGURE 5, which output signal is passed through OR gate $OR_9$ thereby generating an output signal of binary "1" level at the terminal N. AND gate $A_{13}$ generates an output signal when relay contact $P_5$ is in the position opposite that shown in FIGURE 5 when a binary "0" level signal is impressed upon input terminal "J" and when AND gate $A_{10}$ generates an output signal, thus providing a signal at output terminal M. The logical equations for these operations are, therefore, as follows:

$$
\begin{aligned}
N &= A_9.A_{10}.S \\
&= (aA+\overline{aA})(bB+\overline{bB})(cC+\overline{cC})(dD+\overline{dD})(eE+\overline{eE}) \\
&\quad (fF+\overline{fF})(gG+\overline{gG})(hH+\overline{hH}) \\
M &= A_{10}.j.t. \\
&= 0
\end{aligned}
$$

Thus, the outputs of figures in odd number positions are blocked and the letter corresponding to the number having each four unit output of A, B, C, D and E, F, G, H from the output terminal N corresponding to the figures in even numbers, as its numbers in the places of the ones and tens positions, respectively, is printed.

As stated above, it is a distinctive feature of this circuit that checking for both letters and numerals is performed by using the identical check circuits and, therefore, transferring its input by means of a relay providing results thereof which can be tabulated and printed automatically.

Printing is done by the print magnets as shown in FIGURES 1 and 4 of which 120 are provided in the examples set forth herein. It should be noted that a greater or lesser number may be utilized since the number of print hammers employed lends no novelty to the instant invention.

When the types to be printed come to the predetermined locations with respect to the drive hammers by means of the rotation imparted to the printing drum which revolves at a constant speed, the drive hammers are actuated as previously described by the pulse generating means which operates under control of the printing drum rotation to generate pulses which are supplied to the counter means 19 for the purpose of generating a coded representation which when exactly the same as the coded representation in the register means 11' acts to initiate the printing operation. The printing of one line is performed with the type wheel making one complete revolution while figures of odd numbers are shifted from those of even numbers by one pitch to prevent side print in the printing operation.

Figure 6:
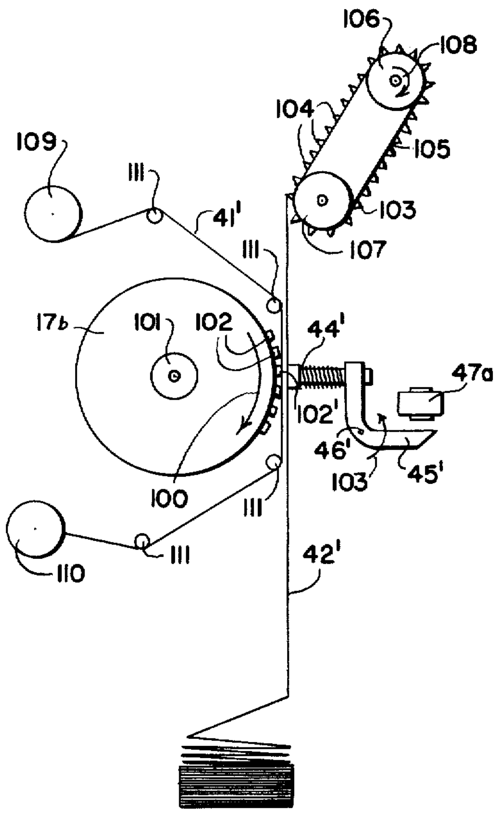
FIGURE 6 is a side elevational view showing the printing apparatus of the printing system in greater detail.

FIGURE 6 is simplified representation of the printing mechanism which consists of the rotating drum **17*b* moving in the direction of arrow 100 about its pivot point 101. A plurality of type faces 102 are provided in the surface of drum 17*b*. The print pulse is received by relay 47*a* (note also FIGURE 4) causing armature 45'** to rotate counterclockwise about its pivot point 46' as shown by arrow 103. This causes the drive hammer 44' to move horizontally to the left, driving the desired type 102' into contact with ribbon 41' causing the character to be printed on the surface of paper 42'. A paper feeder arrangement 103 is provided for drawing the paper 42' vertically upward. The small pins 104 provided on the paper feed mechanism are arranged on an endless belt 105 which is positioned around rollers 106 and 107 and driven by means of imparting rotation to roller 106 as shown by arrow 108. Ribbon 41' is stretched around spools or rollers 111 so that it is unraveled from spool 109 by means of take-up spool 110. A ribbon which is sufficiently wide to accommodate all of the type faces of each generatrix of the printing drum is provided. The ribbon is actuated by rotation of the type wheel **17*b* and carried forward by one pitch for every one-line typewriting operation. After completion of one-line printing a paper feed pulse is received from the line feed circuit at the ribbon feed clutch magnet (not shown) providing ribbon feed at the same time the sheet is carried forward by the line feed operation. The function of the paper feed enables the use of sheet paper of any size having perforations for feeding at both edges. After completion of printing of one complete line the next zone pulses are read by the control circuit of the control circuit 11*a*' of the register means 11'**, thereby supplying the line feed pulse to the paper feed clutch magnet (not shown) to accomplish the line feed operation.

Assuming the printing cycles are represented by the letters A through F relation to the feed cycle will be:

Printing cycle A, B, C, D, E and F
Feed cycle A, B
Printing cycle C, D, E, F, A and B
Feed cycle C, D Although the above arrangement employs a printing assembly of the drum type, belt or bar types operate equally as well and the counter means of the instant arrangement is capable of accomplishing the same control function by use of these other types.

It can, therefore, be seen that we have provided a printing arrangement in which the encoded information group transferred from the computer is arranged so as to be in one or two-character encoded pairs for representation of letters or numerals respectively for each word of the information group and by designating the character of the type face in each specific location along the generatrix by one of these predetermined one or two character pair encoded groupings. The check system employed is a logical arrangement and the circuit elements employed therein for checking numerals and letters are utilized to the greatest extent practicable for the coincidence operation.

Although we have described preferred embodiments of our novel invention, many variations and modifications will now be obvious to those skilled in the art, and we prefer therefore to be limited not by the specific disclosure herein but only by the appended claims.

The embodiments of the invention in which an exclusive privilege or property is claimed are defined as follows:

1. Printing means for use in computer systems and the like, comprising register means for receiving first binary coded data representations from the computer output; coincidence checking means having first and second input means; a rotatable printing drum having a plurality of generatrices around its periphery; cooperating drive hammer means positioned adjacent the drum surface associated with each generatrix; each generatrix being comprised of a plurality of different characters; said drive hammer means being aligned transverse to the rotational direction of said drum; signal pulse generating means under control of and synchronized by the rotation of said printing drum for generating a series of pulses; counter means connected to said signal pulse generating means for generating at its output a second binary coded representation under control of said series pulses, said second binary coded representation being indicative of a predetermined angular position of said rotatable drum, signal pulse generating means comprising first means for dividing a single revolution of said rotatable drum into a plurality of discrete portions; sensing means for generating an output signal upon the initiation of each of said discrete portions; coincidence means for enabling the operation of said hammer means upon receipt of the first output signal of said sensing means to permit initiation of the printing operation at the beginning of any one of said discrete portions, the first and second binary coded representation from the computer and the counter means output respectively being impressed upon said coincidence circuit first and second input means respectively, said coincidence check means being adapted to generate a driving pulse at its output upon coincidence between said first and second encoded data representations impressed upon its first and second input means, said coincidence circuit output being connected to said drive hammer means for printing the desired alphameric character upon occurrence of coincidence.

2. Printing means for use in computer systems and the like, comprising register means for receiving first binary coded data representations from the computer output coincidence checking means having first and second input means; a rotatable printing drum having a plurality of generatrices around its periphery; cooperating drive hammer means positioned adjacent the drum surface associated with each generatrix; each generatrix being comprised of a plurality of different characters; said drive hammer means being aligned transverse to the rotational direction of said drum; signal pulse generating means under control of and synchronized by the rotation of said printing drum for generating a series of pulses; counter means connected to said signal pulse generating means for generating at its output a second binary coded representation under control of said series pulses, said second binary coded representation being indicative of a predetermined angular position of said rotatable drum, signal pulse generating means comprising first means for dividing a single revolution of said rotatable drum into a plurality of discrete portions; sensing means for generating an output signal upon the initiation of each of said discrete portions; coincidence means for enabling the operation of said hammer means upon receipt of the first output signal of said sensing means to permit initiation of the printing operation at the beginning of any one of said discrete portions, the first and second binary coded representation from the computer and the counter means output respectively being impressed upon said coincidence circuit first and second input means respectively, said coincidence check means being adapted to generate a driving pulse at its output upon coincidence between said first and second encoded data representations impressed upon its first and second input means, said coincidence circuit output being connected to said drive hammer means for printing the desired alphameric character upon occurrence of coincidence; second counting means for counting the number of said discrete portions which have been sensed by said sensing means; said counting means being adapted to disable said hammer means when the count accumulated in said counter means represents a complete revolution from the start of the counting operation.

3. Printing means for use in computer systems and the like, comprising register means for receiving first binary coded data representations from the computer output; coincidence checking means having first and second input means; a rotatable printing drum having at least one cooperating drive hammer means positioned adjacent the drum surface; signal pulse generating means under control of and synchronized by the rotation of said printing drum for generating a series of pulses; counter means connected to said pulse signalling means for generating at its output a second binary coded representation under control of said series pulses, said second binary coded representation being indicative of a predetermind angular position of said rotatable drum, the first and second binary coded representation from the computer and the counter means output respectively being impressed upon said coincidence circuit first and second input means respectively, said coincidence check means being adapted to generate a driving pulse at its output upon coincidence between said first and second encoded data representations impressed upon its first and second input means, said coincidence circuit output being connected to said drive hammer means for printing the desired alphameric character upon occurrence of coincidence, said pulse generating means being comprised of an illuminating source and photo-electric sensing means positioned to receiving light rays therefrom; a slotted member rotatably driven by said printing drum and positioned between said illuminating source and said sensing means for alternately permitting and preventing said light rays from impinging upon said sensing means, said sensing means being adapted to generate a pulse when light rays strike said sensing means, said pulse counter means being adapted to generate a binary coded decimal representation wherein said count is increased by one upon occurrence of each pulse from said pulse generating means; a plurality of generatrices around its periphery; control means connected to said register means; said register means having a plurality of register portions each being adapted to store a binary coded representation therein and a zero position portion further being provided in said register means for storing an alphabetic-numeric identifying word employed to identify the type of characters stored in the portions of said register means, said register means being adapted to store a binary coded decimal representation in one of said portions when said zero position identifies said register means as storing a numeric character and being further adapted to store two binary coded representations employed for the purpose of identifying an alphabetic character in two of said register portions when said zero position identification portion identifies said register means as storing an alphabetic character; said control means being adapted to connect one portion of said register means to said coincidence checking means when a coded numeric character is being checked for coincidence and being further adapted to connect two of said register storage portions to said coincidence checking means when said register means contains an alphabetic character.

4. Printing means having a print drum for use in computer systems and the like comprising first register means having a plurality of storage groups each having a storage capacity capable of storing $n$ bits whereby said $n$ bits are coded representations of characters to be printed; second register means employed for identifying the types of characters stored in said plurality of storage groups, said second register means having a bit length equal in number to the number of storage groups in said first register means, each bit of said second register means being adapted to identify a type of character stored in an associated one of said plurality of storage groups; said storage groups being operated in such a manner that one storage group is adapted to store a single numerical encoded figure and that two of said register groups taken together represent an alphabetic character; coincidence checking means comprising first and second coincidence checking gating circuitry; printing means including print actuating means and counting means for identifying the printing position of said print actuating relative to said print drum; control means for connecting one of said register groups and said counting means to said first coincidence checking gating circuitry when a numerical coded figure is stored in said register groups and for connecting both of said first and second coincidence checking circuits to said counter means and two groups of said register groups when an alphabetic encoded figure is stored in said register groups.

5. Printing means for use in computer systems and the like, comprising register means for receiving first binary coded data representations from the computer output; coincidence checking means having first and second input means; a rotatable printing drum having at least one cooperating drive hammer means positioned adjacent the drum surface; signal pulse generating means under control of and synchronized by the rotation of said printing drum for generating a series of pulses; counter means connected to said pulse signalling means for generating at its output a second binary coded representation under control of said series pulses, said second binary coded representation being indicative of a predetermined angular position of said rotatable drum, the first and second binary coded representation from the computer and the counter means output respectively being impressed upon said coincidence circuit first and second input means respectively, said coincidence check means being adapted to generate a driving pulse at its output upon coincidence between said first and second encoded data representations impressed upon its first and second input means, said coincidence circuit output being connected to said drive hammer means for printing the desired alphameric character upon occurrence of coincidence, said pulse generating means being comprised of an illuminating source and photo-electric sensing means positioned to receiving light rays therefrom; a slotted member rotatably driven by said printing drum and positioned between said illuminating source and said sensing means for alternately permitting and preventing said light rays from impinging upon said sensing means, said sensing means being adapted to generate a pulse when light rays strike said sensing means, said pulse counter means being adapted to generate a binary coded decimal representation wherein said count is increased by one upon occurrence of each pulse from said pulse generating means; said pulse counter means comprising first and second counter portions; said register means comprising at least first, second and third register portions, said first and second register portions capable of storing binary coded decimal representations therein, said third register portion being employed for identifying the type of character stored in said first and second register portions, said third register portion being in a first binary state to identify first and second decimal characters as being stored in said first and second portions; a third portion being in the opposite binary state to identify a single alphabetic character stored in said first and second register portions wherein both said first and second register portions identify a single alphabetic character; control means for connecting one of said first and second register portions at a time together with one of said first and second counting portions to said coincidence checking means when said third register portion identifies the register means as storing numeric characters, and said control means being further adapted to connect both said first and second register portions and said first and second counting portions to said coincidence checking means when said third register portion identifies said register means as storing an alphabetic character.

References Cited in the file of this patent

UNITED STATES PATENTS

| | | |
|---|---|---|
| 2,757,605 | Dumey | Aug. 7, 1956 |
| 2,906,200 | Pfleger | Sept. 29, 1959 |
| 2,915,967 | Gehring et al. | Dec. 8, 1959 |
| 2,978,977 | Eckert et al. | Apr. 11, 1961 |
| 3,024,723 | Wasserman | Mar. 13, 1962 |